Figure 1:
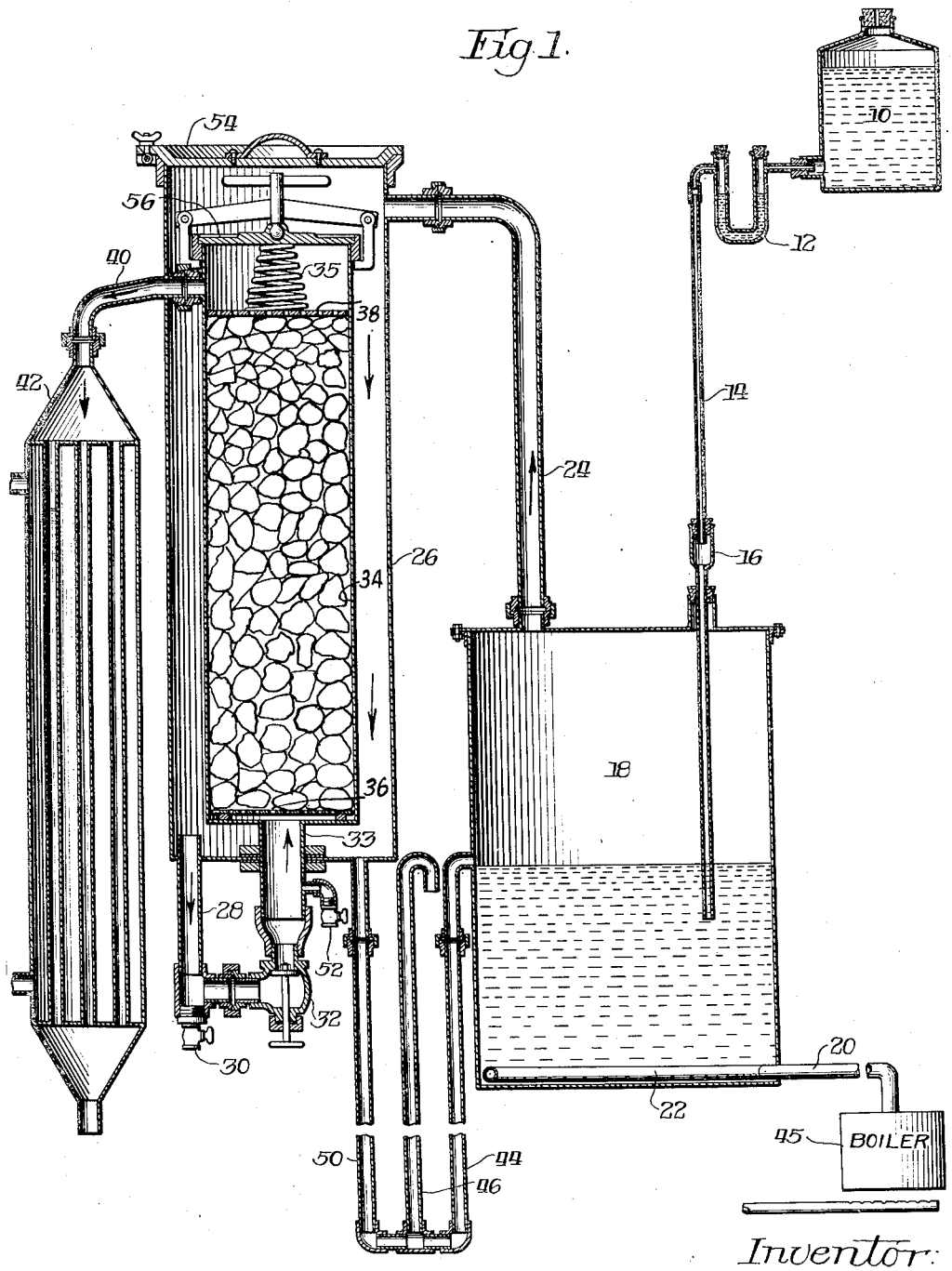

Nov. 29, 1932.  E. TRUOG  1,889,617

VAPOR PURIFICATION PROCESS

Filed Aug. 17, 1929

Inventor:
Emil Truog
By Wilkinson, Huxley, Byron & Knight
Attys.

Patented Nov. 29, 1932

1,889,617

UNITED STATES PATENT OFFICE

EMIL TRUOG, OF MADISON, WISCONSIN

VAPOR PURIFICATION PROCESS

Application filed August 17, 1929. Serial No. 386,725.

The present invention, in general, relates to a process for purifying liquids or solids, and has reference more particularly to a process and a preferred embodiment of apparatus for removing impurities such as grease, oil, acids and alkalies from liquids after they have been vaporized.

The present invention is concerned with the purification of those substances which are liquids or solids at ordinary temperatures and pressures, but which can be vaporized by the application of heat thereto, thus allowing the vapors to be processed for the removal of impurities. It is in the purifying of this class of vapors that the present process is primarily adapted, although not limited thereto, as it can be employed with equal efficiency in the purifying of those substances which may be vaporized by the combination of heat and reduced pressures. In applying the above process, that of passing the substances through purifying ingredients, to this latter class of vapors, it has been found that the efficiency of the process is materially reduced due to the physical characteristics of the vapors in that they condense at ordinary temperatures and therefore condense and form a film of liquid over the surface of the purifying ingredients. This condensate on the surface of the ingredients renders the latter substantially inert and non-absorbent so that the vapors which are passed through later remain unpurified. As a means for increasing the efficiency of this process, the present invention provides for maintaining the body of purifying ingredients at a temperature equal to or above the temperature of condensation of the vapors, which insures that the vapors will not condense on the surface of the ingredients, but will remain in their vaporized state throughout the purifying process.

It is an object of this invention, therefore, to provide a process for the purification of those substances which are liquids or solids at ordinary temperatures and pressures, which consists in first vaporizing the substances by heat, then processing the vapors to remove impurities while maintaining the purifying ingredients at the same temperature as the vapors to prevent their condensation.

The process finds its most extensive application to the removal of grease and oil from steam, and has therefore been described and illustrated in relation to an apparatus for receiving steam from a central power station and for processing the steam to produce a high grade of distilled water.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a vertical, sectional view of a complete arrangement of apparatus for the production of pure, distilled water.

The equipment consists of a trap or kettle 18 which houses the steam supply pipe 20 at that portion containing the perforations 22. At the upper end of the trap 18 an outlet pipe 24 is provided for joining the trap with the cylinder 26, which latter is also provided with outlet means comprising the pipe 28 and valve 30. Mounted within the cylinder and spaced therefrom is a charcoal container 34 having at its lower end an inlet pipe 33 and valve 32. Perforated brass disks 36 and 38, and a coil spring 35 are provided for confining the charcoal in the container 34 and for preventing the charcoal from fissuring from the passage of the vapors. A conventional type of condenser 42 has a steam connection at 40 with the upper portion of the container for collecting and condensing the vapors into their liquid form.

In the operation of the apparatus thus far described, the steam supply pipe 20 conducts the steam from a conventional source of supply such as the boiler 45 into the trap 18 where it escapes by reason of the perforations 22. The trap 18 is filled with water to its overflow mark which causes the steam escaping through the perforations 22 to work its way through the water and pass through the connection 24 into the cylinder 26. It is, of course, understood that in the first few minutes of operation the water in the trap 18 will condense the steam issuing from the perforations 22 until the temperature of the water is raised to its boiling point, when the steam will then pass through the water and into the cylinder 26 as described. At this stage the valve 32 is kept closed and the valve 30 is opened so that the steam will escape from the cylinder 26 into the atmosphere. During this escaping period, which is maintained from 15 to 20 minutes, the charcoal in the container will become heated since the steam contacts and surrounds the container in its passage through the cylinder. After the charcoal has been sufficiently heated to insure that the steam will not condense on the charcoal, it is safe to allow the steam into the container, which is accomplished by opening the valve 32 and closing the valve 30. The steam will then pass through the perforated disk 36 and through the dry charcoal in the container 34 which absorbs the last traces of grease and oil in the final stage of purification of the steam. The steam, after working through the charcoal, will then pass out of the container through the connection 40 into the condenser 42 where it will be condensed and can be collected as desired.

To provide a simple and effective means for the removal of condensed water from the trap 18 and from the cylinder 26, and to maintain a water level in the trap 18, drains and waste pipes are arranged in the form as illustrated at 44, 46 and 50. For ordinary operation it is sufficient if the drains and waste pipes are from 5 to 7 feet in height.

The efficiency of the above process may be increased by covering the outside of 18, 24, 26 and 28 with insulation which will decrease the condensation of steam in its passage through these parts. It is necessary, however, to have some condensation in the trap 18 to provide for some overflow of water to carry away the impurities which are entrapped in this vessel. An overflow of one liter per hour is sufficient for the size of apparatus described, and the insulation may be regulated in accordance with this.

To provide for the removal of ammonia from the water vapor, the water in trap 18 is kept slightly acid by the introduction of an acid solution such as a five per cent potassium acid sulphate solution. This is accomplished automatically by means of the arrangement shown consisting of a reservoir 10 for the acid solution, a U tube 12, partly filled with filter paper pulp or other filtering material which filters the solution, a capillary tube 14, which regulates the flow and a thistle top tube 16, which makes a convenient connection with 18. The rate of flow of the acid solution is controlled by the bore and length of the capillary tube. A flow of about one drop per minute is ordinarily satisfactory. The rate must, of course, be regulated according to the load and the ammonia content of the water vapor.

To stop the operation of the apparatus, the valve 30 is first opened which allows the steam to exhaust into the atmosphere, after which the valve 32 is closed. A pressure air pump is attached to valve 52, and the valve is opened and air is forced into 34. This drives out the water vapor from around the charcoal which would otherwise condense and leave the charcoal in a wet and unsatisfactory condition. When substantially all of the water vapor has been driven out, the steam supply at 20 is closed.

After a time it may be necessary to place new charcoal in the container 34. To recharge, the covers 54 and 56 are removed, disk 38 is lifted out and the charcoal is removed with a scoop or dipper. The cylinder is then filled with fresh charcoal which is packed lightly. The part 38 and covers are then replaced and the recharging is completed. For the production of absolutely pure water a charcoal called "activated charcoal" has been found to give very satisfactory results.

Under conditions in which the steam supply is discontinuous and may be interrupted without notice, it is advisable to surround the container 34 with an electric coil or heating element of sufficient capacity to maintain a temperature equal to that of boiling water in the container. This will prevent the condensation of water around the charcoal and maintain a condition under which the steam supply may stop and start without notice and still give satisfactory results.

By means of this principle of pre-heating, made possible through the use of the double cylinder apparatus described, it is feasible to introduce a layer of soda lime in 34 for the purpose of removing carbonic acid or any other acid from the water vapor. A high lime soda is especially well adapted for this purpose. Under the conditions prevailing in this apparatus, the soda lime remains sufficiently dry to make its use satisfactory. It has also been discovered that charcoal, or any inert material, impregnated with about five per cent of potassium or sodium acid sulphate, may be placed in a layer in 34 where it will serve for the removal of ammonia or other basic substances and remain sufficiently dry to make the operation satisfactory. In place of acid sulphate, acid phosphates or other acid salts may be used.

Commercially, it has been found very practical to use soda lime and acid sulphate in the manner just described to remove acids and bases from water vapor which may not contain grease or oil, when it is desired to produce distilled water of the highest purity. In other words, the principle of pre-heating or continuous heating in a double cylinder has wide application in making possible the use of solid absorbents for the removal of impurities from water vapor or other vapors.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A process for purifying a liquid which consists in vaporizing the liquid by the application of heat, passing the vapors through a dilute acid solution to remove basic impurities, passing the washed vapors around a body of charcoal to heat the charcoal, and conducting the vapors through the body to contact with the heated charcoal to remove physical impurities, whereby condensation of the vapors is prevented and purification of the vapors is materially increased.

2. In an apparatus for purifying liquids comprising means for vaporizing the liquids, a water container for washing the vapors, means for supplying acid in minute quantities to said container, a cylinder having connection with said container, a second container for receiving purification ingredients located within and spaced from said cylinder, and condenser means having connection with said second container for receiving therefrom and condensing the purified vapors.

3. In an apparatus for purifying liquids comprising means for vaporizing the liquids by applying heat thereto, a water container for washing the vapors, means for supplying acid in minute quantities to said container, a cylinder having connection with said container, a charcoal container within and spaced from said cylinder, means communicating with the lower end of said charcoal container and forming a passage connecting the cylinder with the container, and condenser means having connection with the charcoal container for condensing the purified vapors.

Signed at Madison, Wisconsin, this tenth day of August, 1929.

EMIL TRUOG.